US012022268B1

(12) United States Patent
Stamenovic et al.

(10) Patent No.: US 12,022,268 B1
(45) Date of Patent: Jun. 25, 2024

(54) ARTIFICIAL INTELLIGENCE (AI) ACOUSTIC FEEDBACK SUPPRESSION

(71) Applicant: Bose Corporation, Framingham, MA (US)

(72) Inventors: Marko Stamenovic, Jamaica Plain, MA (US); Li-Chia Yang, Chelmsford, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 18/530,669

(22) Filed: Dec. 6, 2023

(51) Int. Cl.
*H04R 3/02* (2006.01)
*G06N 3/0464* (2023.01)
*H04R 3/04* (2006.01)
*H04R 25/00* (2006.01)
*H04R 27/00* (2006.01)

(52) U.S. Cl.
CPC .................. *H04R 3/02* (2013.01); *H04R 3/04* (2013.01); *H04R 25/453* (2013.01); *H04R 27/00* (2013.01); *G06N 3/0464* (2023.01)

(58) Field of Classification Search
CPC .......... H04R 3/02; H04R 3/04; H04R 25/453; H04R 27/00; G06N 3/0464
See application file for complete search history.

(56) References Cited

U.S. PATENT DOCUMENTS

| 10,306,386 | B2 | 5/2019 | Warden et al. | |
| 10,524,042 | B2 | 12/2019 | Brousseau et al. | |
| 10,555,101 | B2 | 2/2020 | Warden et al. | |
| 2020/0243094 | A1* | 7/2020 | Thomson | G10L 15/32 |
| 2023/0239638 | A1 | 7/2023 | Jackson et al. | |
| 2023/0410828 | A1* | 12/2023 | Pishehvar | G10L 21/034 |

OTHER PUBLICATIONS

Bose-S1-Pro, Owners Guide, Apr. 2018, 19 pages.

* cited by examiner

*Primary Examiner* — Andrew L Sniezek
(74) *Attorney, Agent, or Firm* — Hoffman Warnick LLC

(57) ABSTRACT

Various implementations include audio processing system having artificial intelligence (AI) acoustic feedback suppression. In some particular aspects, an audio processing system includes: an input adapted to receive an acoustic signal via a microphone; an electroacoustic transducer; an amplifier configured to amplify the acoustic signal and output an amplified signal via the electroacoustic transducer; and an artificial intelligence (AI) system having a machine learning model that processes the acoustic signal prior to amplification to produce a dynamic filter, wherein the AI system applies the dynamic filter to the acoustic signal to suppress feedback in the amplified signal.

20 Claims, 4 Drawing Sheets

ARTIFICIAL INTELLIGENCE (AI) ACOUSTIC FEEDBACK SUPPRESSION

TECHNICAL FIELD

This disclosure generally relates to acoustic feedback suppression. More particularly, the disclosure relates to suppressing acoustic feedback using artificial intelligence (AI).

BACKGROUND

Acoustic feedback occurs in an audio system when a coupling, i.e., an acoustic path, exists between an audio input and an audio output to cause a positive interference. For example, in a public address (PA) system, feedback occurs when a microphone picks up an acoustic signal of a loudspeaker while the loudspeaker is outputting sound from the microphone. Feedback can also occur in other audio systems as well, such as hearing assist devices.

SUMMARY

All examples and features mentioned below can be combined in any technically possible way.

Various implementations include audio processing systems and methods that provide artificial intelligence (AI) acoustic feedback suppression. In some cases, an audio processing system includes: an input adapted to receive an acoustic signal via a microphone; an electroacoustic transducer; an amplifier configured to amplify the acoustic signal and output an amplified signal via the electroacoustic transducer; and an AI platform having a machine learning model that processes the acoustic signal prior to amplification to produce a dynamic filter, where the AI platform applies the dynamic filter to the acoustic signal to suppress feedback in the amplified signal.

In additional cases, a method includes: receiving an acoustic signal via a microphone input; generating a dynamic filter from the acoustic signal using a machine learning model; applying the dynamic filter to the acoustic signal to suppress feedback in the acoustic signal; amplifying the dynamically filtered acoustic signal to generate an amplified signal; and outputting the amplified signal to an electroacoustic transducer.

Implementations may include one of the following features, or any combination thereof.

In some cases, the machine learning model comprises a neural network.

In particular aspects, the neural network includes one of a temporal convolutional network (TCN) or a convolutional long short term memory (ConvLSTM) network.

In certain implementations, the AI platform transforms the acoustic signal into a sequence of spectral frames that are inputted to the machine learning model.

In particular aspects, the acoustic signal is transformed with an asymmetric-windowed Fast Fourier Transform (FFT).

In some cases, each spectral frame includes approximately 100-300 frequency bins.

In particular aspects, processing of the acoustic signal includes: generating a spectral mask using the machine learning model for each spectral frame; applying each spectral mask to associated spectral frames to generate a sequence of filtered spectral frames; and applying an inverse asymmetric-windowed FFT to the filtered spectral frames to generate a filtered time domain acoustic signal.

In certain implementations, the machine learning model directly generates a sequence of filtered spectral frames.

In particular cases, the machine learning model directly generates a filtered time domain acoustic signal.

In certain implementations, the machine learning model is trained with an input signal that includes a target audio component and a feedback component, and the machine learning model is trained to filter out the feedback component.

In some respects, the target audio component comprises at least one of speech or music.

In certain aspects, the input signal used to train the machine learning model further includes a noise component, and the machine learning model is trained to filter out the noise component.

In particular cases, the AI platform includes a plurality of machine learning models, where each machine learning model is trained to pass a predefined audio component and filter unwanted audio components. Unwanted audio components may for example include feedback, environmental noise, music, speech, etc.

In other cases, the AI platform utilizes a single machine learning model conditioned on various filtering modes, thus allowing the machine learning model to selectively pass selected audio component(s) and filter unwanted audio component(s).

In certain aspects, each of the plurality of the machine learning models is selectable via a user input.

In some implementations, the audio processing system is embodied in a public address system.

In some implementations, the audio processing system is embodied in a hearing assist device.

In certain aspects, the latency between a received acoustic signal and an amplified output is less than 10 milliseconds.

In additional implementations, a method includes: receiving an acoustic signal via a microphone input; generating a dynamic filter from the acoustic signal using a machine learning model; applying the dynamic filter to the acoustic signal to suppress feedback in the acoustic signal; amplifying the dynamically filtered acoustic signal to generate an amplified signal; and outputting the amplified signal to an electroacoustic transducer.

Two or more features described in this disclosure, including those described in this summary section, may be combined to form implementations not specifically described herein.

The details of one or more implementations are set forth in the accompanying drawings and the description below. Other features, objects and benefits will be apparent from the description and drawings, and from the claims.

DETAILED DESCRIPTION

Figure 1:
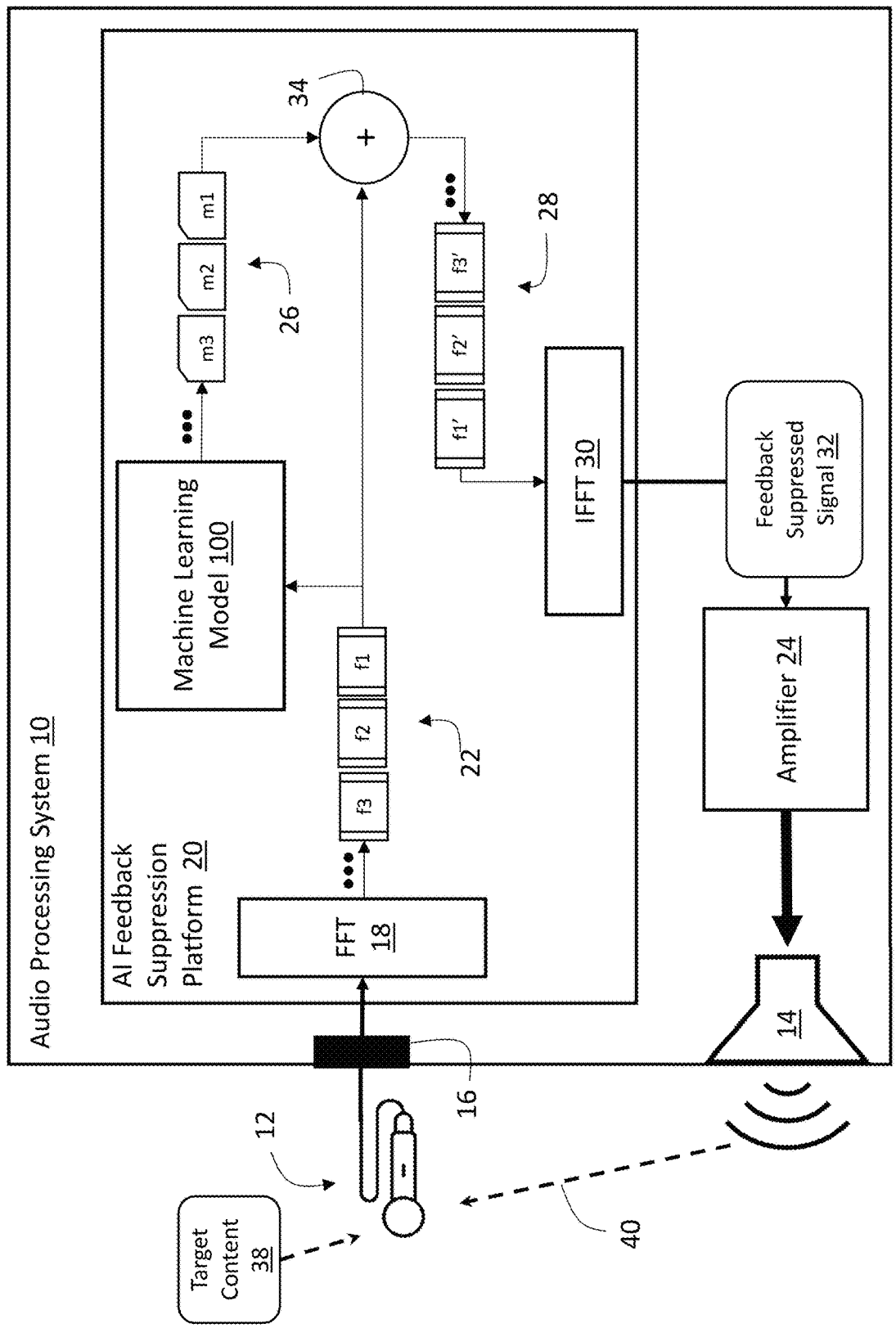
FIG. 1 depicts an audio system having an artificial intelligence (AI) platform for suppressing acoustic feedback, in accordance with various implementations.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

As noted herein, feedback occurs in an audio system when, e.g., a microphone picks up an acoustic signal of a speaker while the speaker is outputting sound received from the microphone. This disclosure is based, at least in part, on the realization that existing feedback suppression solutions (e.g., gain control, notch filters, and adaptive feedback cancellation) do not always fully eliminate feedback, particularly under challenging scenarios. Further, such existing techniques may add unwanted coloration to the feedback suppressed signal.

The present solution provides an artificial intelligence (AI) based acoustic feedback suppression platform that can be implemented in or with any audio processing system that is susceptible to feedback, e.g., a public address (PA) system, hearing assist systems, etc. The platform is capable of providing beneficial feedback suppression with minimal degradation of the acoustic signal. Further, the platform is capable of achieving very low latencies. In certain approaches, a low-latency AI spectral masking prediction network is provided to filter out unwanted content (e.g., non-speech content), preventing the occurrence of feedback loops and passing target content (e.g., speech or music) without distortion.

FIGS. 1-4 depict various illustrative embodiments of an audio processing system 10 having an AI feedback suppression platform 20. Distinct aspects of an AI feedback suppression platform are illustrated in distinct FIGURES. Note that commonly labeled components in the figures are considered to be substantially equivalent components for the purposes of illustration, and redundant discussion of those components is omitted for clarity.

Referring to FIG. 1, audio processing system 10 generally includes an input 16 configured to receive acoustic signals (e.g., target content 38) via a microphone 12, an amplifier 24 configured to amplify the acoustic signals (after processing), and an electroacoustic transducer (e.g., speaker) 14 configured to output amplified acoustic signals. In this illustrative approach, feedback 40 occurs when output from the electroacoustic transducer 14 is picked up by microphone 12, thereby negatively (or, undesirably) impacting the input 16.

To address the feedback issue, audio processing system 10 further includes an AI feedback suppression platform ("AI platform") 20 that processes the inputted acoustic signal captured at input 16 and generates a feedback suppressed signal 32 (i.e., a filtered time domain acoustic signal) prior to amplification by amplifier 24. AI platform 20 includes a fast Fourier transform (FFT) module 18 that transforms the time domain acoustic input signal into a sequence of spectral frames ("frames") 22 (e.g., f1, f2, f3, etc.). In various approaches, each frame contains a time-frequency sound spectrum (i.e., a spectrogram) of signal strengths at different frequencies over a time period. In certain approaches, FFT module 18 includes an asymmetric windowed FFT that generates frames 22 with approximately 100-300 frequency bins for a time sample of several milliseconds. Utilizing an asymmetric windowed FFT with, e.g., approximately 250 bins, allows the platform to achieve very low latencies (e.g., less than 10 milliseconds) while providing a high-quality audio result with acceptable computational overhead. Such a bin configuration can for example provide a 10-20 decibel (dB) signal-to-noise ratio (SNR) gain in suppressing unwanted signals. However, it is understood that any number of bins and/or time sample sizes could be utilized.

In this approach, AI platform 20 includes a machine learning model 100 that processes each frame 22 and generates a dynamic filter, which in this illustrative approach is implemented as a sequence of spectral masks 26 configured to suppress feedback. For instance, mask m1 is generated from frame f1, mask m2 is generated from frame f2, etc. Each mask 26 is then applied to the original frame 22 by combiner 34 to generate an associated filtered frame 28. For example, mask m1 is applied to frame f1 to create a filtered frame f1', mask m2 is applied to frame f2 to create a filtered frame f2', etc. Combiner 34 may use any technique to apply a mask to an associated frame, e.g., using standard matrix or array operators such as matrix addition or multiplication, concatenation, etc. The resulting filtered frames 28 are then processed by an inverse FFT 30 (e.g., an inverse asymmetric-windowed FFT, labeled IFFT 30) to generate the time domain feedback suppressed signal 32, which is amplified by amplifier 24 and outputted by electroacoustic transducer 14. Inverse FFTs are algorithms that convert a signal, e.g., filter frame f1', from the frequency domain to the time domain.

In various aspects, the machine learning model 100 includes a neural network trained to generate a spectral filter (e.g., spectral mask) to remove or separate feedback from a mixed input signal that includes target content 38 (e.g., voice, music, etc.) and feedback 40. For example, the machine learning model 100 may be trained with a database of input signals that include a target audio component and a feedback component. During training, the resulting generated filters are applied to the associated input signals, evaluated for efficacy, and the results are fed back to the machine learning model to train the network.

The neural network may for example include a temporal convolutional network (TCN) or a convolutional long short term memory (ConvLSTM) network. However, it is understood that other neural network architectures could be utilized, particularly those configured to process sequential multidimensional data and predict future frames, e.g., a U-Net architecture.

In certain approaches, the generated filters comprise spectral masks 26, which may for example include ideal binary or ideal ratio masks configured to separate or filter out non-target content, e.g., non-speech content, non-music content, etc. Ideal binary masks operate by retaining the time-frequency regions of the target content 38 that are stronger than the interference (i.e., feedback 40), and discarding the regions that are weaker than the interference. Typically, an ideal mask is a binary matrix, where 1 indicates that the target energy is stronger than the interference energy within the corresponding time-frequency unit and 0 indicates otherwise. This definition implies a 0 decibel signal to noise ratio (SNR) criterion for mask generation, although other SNR criteria are possible. Ideal ratio masks utilize mask gain values that are estimates of the target and mixture signal energy ratios. It is however understood that machine learning model 100 may be trained to generate any type of dynamic filter suitable to separate or remove unwanted sounds.

Using the approaches described herein allows for very low latencies. Latency is, for example, the time delay between the input at the microphone 12 and the output at the speaker 14. Latencies above 15 milliseconds can result in an unacceptable user experience in a PA or hearing assist system. The current approach can for example achieve latencies between approximately 5 and approximately 10 milliseconds. In certain approaches disclosed herein, latencies may be less than approximately 5 milliseconds.

Figure 2:
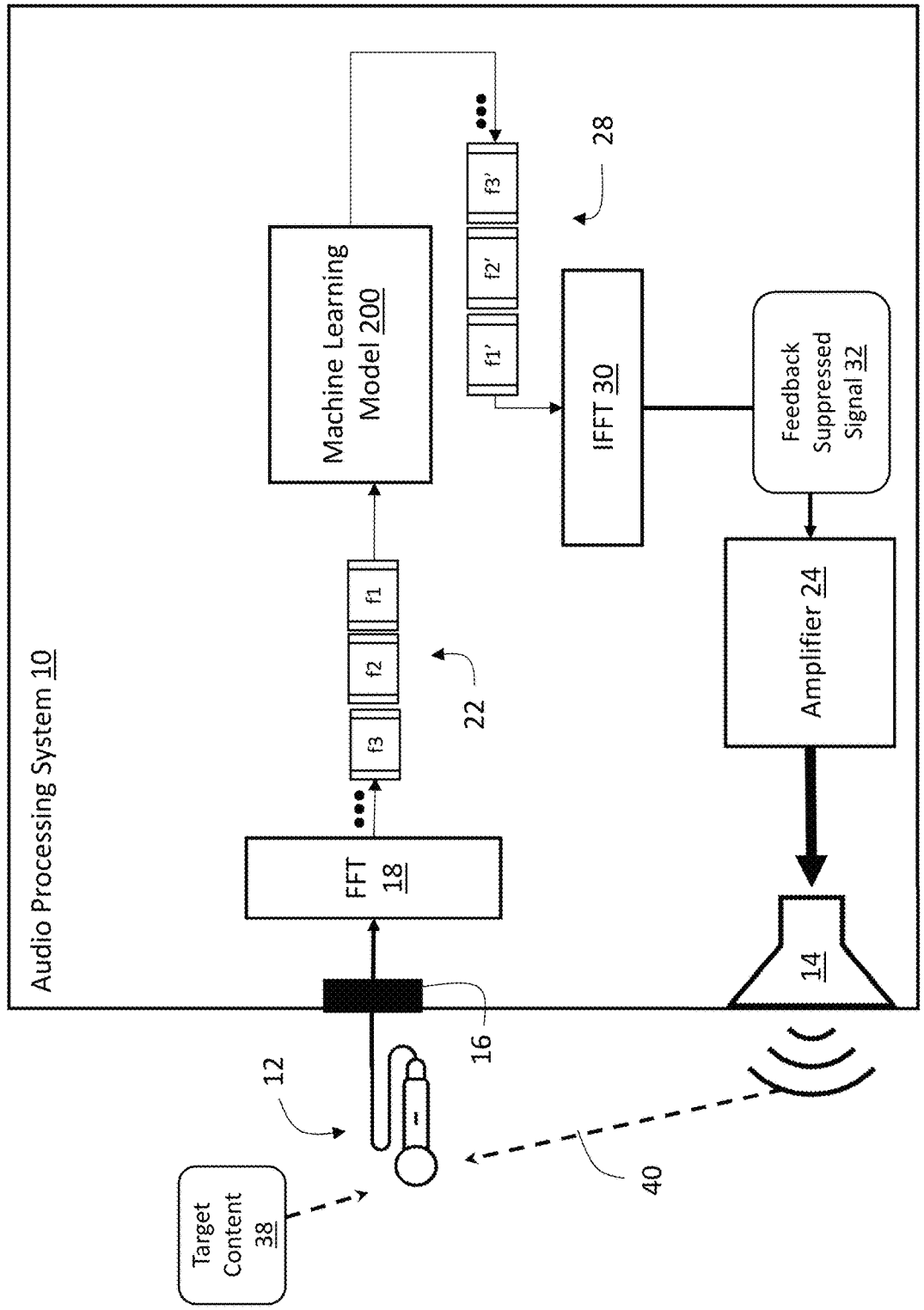
FIG. 2 depicts an audio system having an alternative artificial intelligence (AI) platform for suppressing acoustic feedback, in accordance with various implementations.

FIG. 2 depicts an alternative implementation of an audio processing system 10 that likewise includes an AI platform 20 for generating a feedback suppressed signal 32. Similar to the embodiment of FIG. 1, AI platform 20 includes an FFT module 18 (e.g., an asymmetric-windowed FFT) that generates a sequence of frames 22. However, in this case, rather than generating masks (or some other type of spectral filter), a machine learning model 200 is implemented that internally performs dynamic filtering and directly predicts (i.e., generates) filtered frames 28 from the inputted frames 22. For example, this could be accomplished by replacing the FFT/IFFT modules 18, 30 with a pair of learned one dimensional convolution (i.e., Conv1$d$) filterbanks. The filtering process could be done in the embedding space of those filterbanks. Alternatively, the time domain audio signal could be inputted into model 200 to predict time domain audio.

The filtered frames 28 are thereafter processed by an inverse FFT 30 (e.g., an inverse asymmetric-windowed FFT, or IFFT) to generate the time domain feedback suppressed signal 32. Accordingly, in this case, machine learning model 200 is trained to perform dynamic filtering and predict filtered frames 28 directly from original frames 22 in which feedback 40 is removed or separated from the target content 38, e.g., using similar techniques as noted with respect to FIG. 2. For example, the machine learning model 200 may be trained with a database of input signals that include a target audio component and a feedback component. During training, the resulting filtered frames are evaluated for efficacy, and the results are fed back to the machine learning model to train the network.

Figure 3:
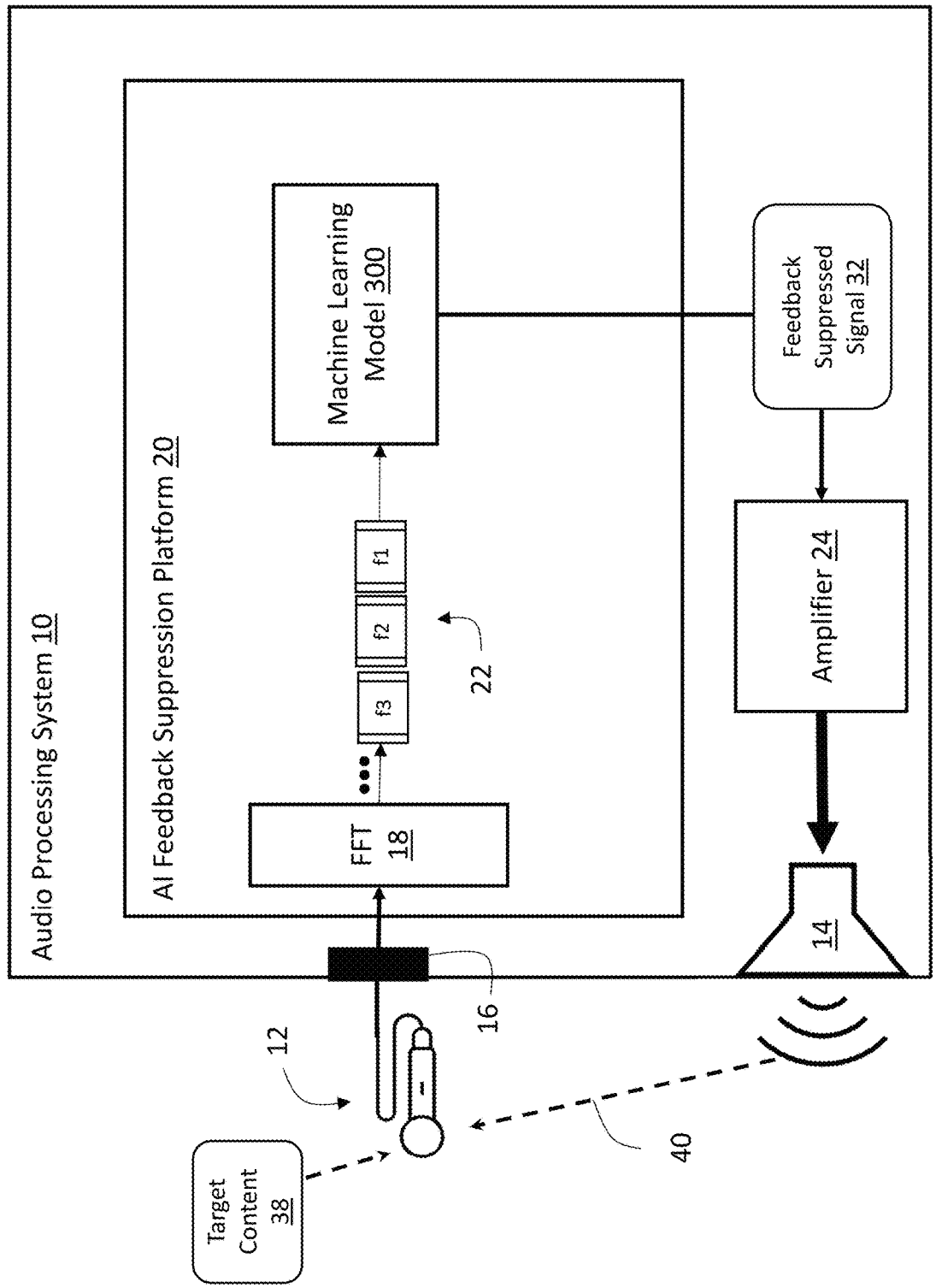
FIG. 3 depicts an audio system having a further alternative artificial intelligence (AI) platform for suppressing acoustic feedback, in accordance with various implementations.

FIG. 3 depicts a further implementation of an audio processing system 10 that includes an AI platform 20 for generating a feedback suppressed signal 32. Similar to the embodiments of FIGS. 1 and 2, AI platform 20 includes an FFT module 18 (e.g., an asymmetric-windowed FFT) that generates a series of frames 22. However, in this case, rather than generating masks or filtered frames, machine learning model 300 directly generates the time domain feedback suppressed signal 32. Accordingly, in this case, machine learning model 300 is trained to dynamically filter the inputted frames 22 and generate the time domain feedback suppressed signal 32 directly from original frames 22, in which feedback 40 is removed from the target content 38. For example, the machine learning model 300 may be trained with a database of input signals that includes a target audio component and a feedback component. During training, the resulting time domain feedback suppressed signal 32 is evaluated for efficacy, and the results are fed back to the machine learning model to train the network.

Figure 4:
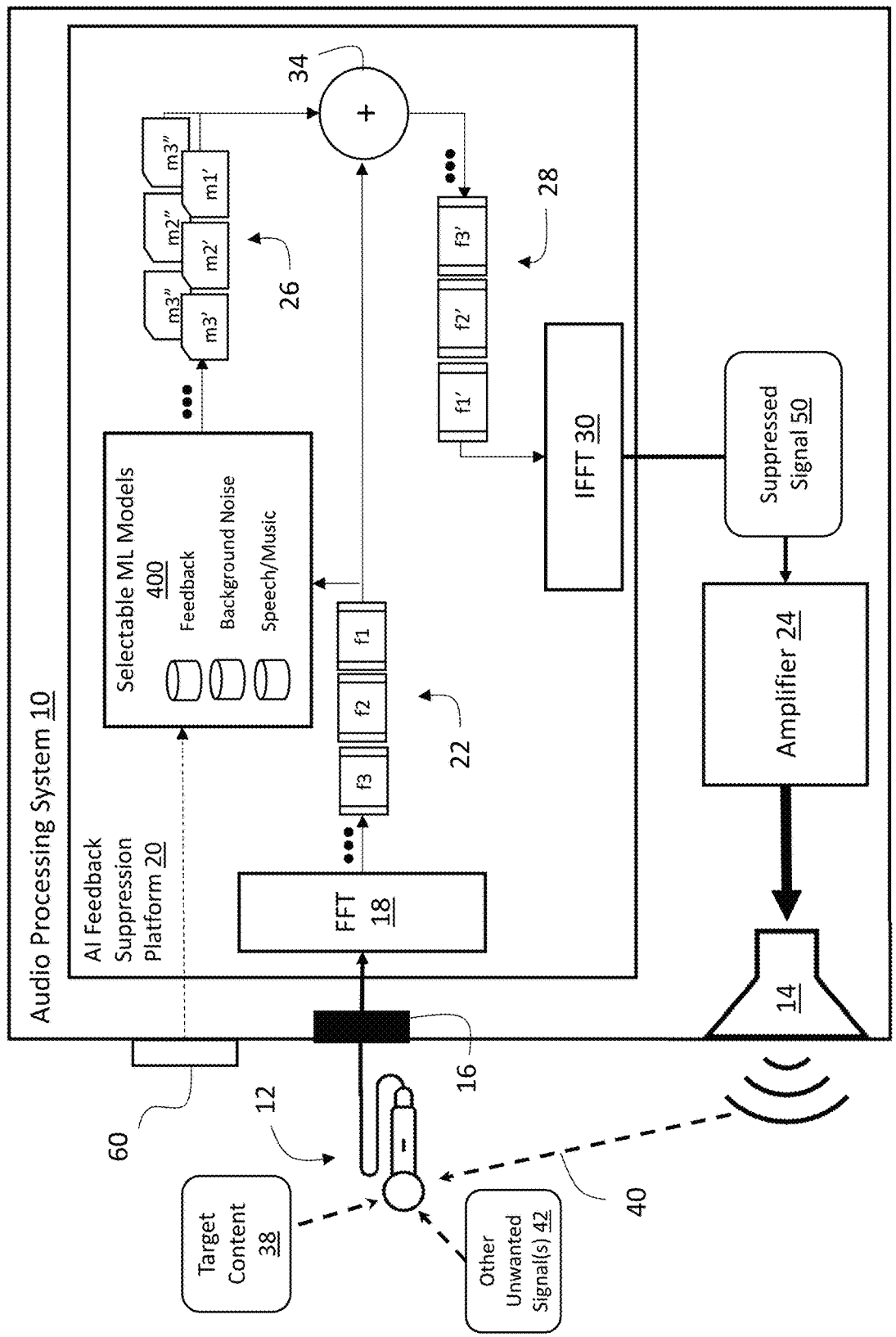
FIG. 4 depicts an audio system having an alternative artificial intelligence (AI) platform for selectively suppressing unwanted sounds, in accordance with various implementations.

FIG. 4 depicts still a further implementation of an audio processing system 10 that includes an AI platform 20. In this approach, AI platform 20 includes a set of selectable machine learning (ML) models 400 configured to selectively suppress or pass different types of acoustic content. In one approach, a control input 60 is provided to allow a user or other system to selectively suppress feedback 40 and/or other unwanted signals 42 such as background/environmental noise, speech, music, drums, etc., or any combination thereof. In other cases, genres of music, such as rock, classical, country could be selected. Furthermore, control input 60 may allow the user or other system to selectively choose the target content 38 that should be allowed to pass, e.g., speech, music, drums, guitar, etc. To achieve this, a set of selectable machine learning models 400 are provided and trained to suppress or pass different types of acoustic content. In various aspects, one or more of the models 400 are implemented to process the inputted frames 22 based on user selections. In an illustrative approach, where multiple models are selected, multiple masks (e.g., m1', m1"; m2', m2", etc.) for each frame (f1, f2, etc.) may be generated (as shown in FIG. 4), or a single combined mask (e.g., m1, m2, etc.) may be generated (as shown in FIG. 1) for each frame (f1, f2, etc.). The masks (either multiple or combined) are then applied back the original frames 22 with combiner 34 to generate filtered frames 28.

In one approach, control input 60 may include an interface (e.g., mechanical or digital) with a set of buttons or dials to suppress or pass different acoustic content. The user could for example select "suppress feedback," "suppress background noise," and "suppress music," in the case where just speech is desired. In other cases, more granular options could be selected, e.g., "suppress drums," "suppress guitar," or "suppress horns." In other cases, the options might include content that the user wants to pass, e.g., "pass vocals," "pass strings," etc. In still other cases, the options may include selectable genres, such as "classical," "rock," "jazz," etc. In the case where a genre is selected, the control input 60 may be pre-programmed to select the appropriate machine learning models 400, e.g., if classical was selected, speech might be suppressed. In still further cases, the control input 60 might include different levels of suppression, e.g., low, medium, and high.

In a further approach, the control input 60 may be configured to receive an input from another sensor or device (e.g., a microphone array, a wind sensor, a smartphone, etc.,), which for example, detects types of ambient noise and/or sounds and automatically selects the appropriate ML model(s) 400. For example, input from a sensor could detect noise in a frequency band that indicates background (e.g., low frequency hum), which causes the control input 60 to select an ML 400 model to suppress background noise. In other cases, a motion or proximity sensor could detect that the user/microphone is in front of the PA system, which would cause the control input 60 to automatically select the feedback suppression ML model 400.

It is understood that an audio processing system 10 with selectable machine learning models 400 could be deployed in any of the various embodiments described in FIGS. 1-4.

Accordingly, the selectable model approach shown in FIG. 4 is not intended to be limited to an embodiment that generates masks. Rather the selectable model approach could be used in a system that generates a different type of dynamic filter, directly generates filtered frames 28, or directly generates the suppressed signal 50.

Furthermore, rather than using multiple models, platform 20 could include one model conditioned on various modes, where each mode corresponds to a different filtering setting. For example, using this this approach, platform 20 could include a separate "hint" ML model (e.g., neural network) that transforms the inputted acoustic signal based on a selected inputted mode (e.g., feedback, background, speech, etc.) into an embedding that the main ML model 100, 200, 300 is conditioned on. The hint ML model and main ML model can be trained together end-to-end or separately. The input to the hint network could be a one-hot vector or an embedding indicating what mode to be in.

It is also understood that variations to the described approaches could likewise be deployed. For example, rather than processing just spectral data, platform 20 could be configured to process both spectral and time domain data with one or more machine learning models. Moreover, in certain embodiments, a feature predictor could be combined with a neural vocoder in order to resynthesize the inputted acoustic signal instead of filtering it. Furthermore, although only one microphone channel is depicted, multiple microphone channels could be utilized. In some embodiments, bone-conduction microphones/signals could be utilized as inputs to the machine learning model(s) to further help suppress feedback and noise.

It is further understood that audio processing system 10 may include other components not shown, including, e.g., pre-amplifiers, equalizers, analog-to-digital converters, digital-to-analog converters, other noise reduction or cancellation systems, communication systems, control systems, other signal processing, etc. As noted, the audio processing system may be deployed with any acoustic system susceptible to feedback, such as a PA system, a hearing assist system, or other systems. The systems and methods disclosed herein may include or operate in, in some examples, cabinets, headsets, headphones, hearing aids, or other personal audio devices, as well as systems that may be applied to public spaces, home, office, or automotive environments. Example PA systems are for example described and illustrated in U.S. Pat. No. 10,555,101 (filed Apr. 2, 2019) and U.S. Pat. No. 10,524,042 (filed Jun. 27, 2017), each of which is incorporated by reference in its entirety. Example hearing assist systems are described and illustrated in U.S. Pat. No. 9,131,321 (issued Sep. 8, 2015) and U.S. Pat. No. 9,560,451 (issued Jan. 31, 2017), each of which is incorporated by reference in its entirety.

In contrast to conventional systems and approaches, various implementations disclosed herein can provide beneficial feedback suppression with minimal degradation of the acoustic signal. Further, the systems and approaches described herein are capable of providing these beneficial performance features with very low latencies (e.g., 5-10 milliseconds). In certain approaches, the low-latency AI spectral masking prediction network has the technical effect of filtering out unwanted content, e.g., non-speech content, preventing the occurrence of feedback loops and passing target content, e.g., speech or music, without distortion or interference.

In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

The term "approximately" as used with respect to values herein can allot for a nominal variation from absolute values, e.g., of several percent or less. Unless expressly limited by its context, the term "signal" is used herein to indicate any of its ordinary meanings, including a state of a memory location (or set of memory locations) as expressed on a wire, bus, or other transmission medium. Unless expressly limited by its context, the term "generating" is used herein to indicate any of its ordinary meanings, such as computing or otherwise producing. Unless expressly limited by its context, the term "calculating" is used herein to indicate any of its ordinary meanings, such as computing, evaluating, smoothing, and/or selecting from a plurality of values. Unless expressly limited by its context, the term "obtaining" is used to indicate any of its ordinary meanings, such as calculating, deriving, receiving (e.g., from an external device), and/or retrieving (e.g., from an array of storage elements). Where the term "comprising" is used in the present description and claims, it does not exclude other elements or operations. The term "based on" (as in "A is based on B") is used to indicate any of its ordinary meanings, including the cases (i) "based on at least" (e.g., "A is based on at least B") and, if appropriate in the particular context, (ii) "equal to" (e.g., "A is equal to B"). Similarly, the term "in response to" is used to indicate any of its ordinary meanings, including "in response to at least."

Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The term "configuration" may be used in reference to a method, apparatus, and/or system as indicated by its particular context. The terms "method," "process," "procedure," and "technique" are used generically and interchangeably unless otherwise indicated by the particular context. The terms "apparatus" and "device" are also used generically and interchangeably unless otherwise indicated by the particular context. The terms "element" and "module" are typically used to indicate a portion of a greater configuration. Any incorporation by reference of a portion of a document shall also be understood to incorporate definitions of terms or variables that are referenced within the portion, where such definitions appear elsewhere in the document, as well as any figures referenced in the incorporated portion.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Machine learning models described herein may for example be implemented in software, hardware, or a combination thereof. Machine learning models described herein may include a deep neural network (DNN), which is a type of artificial neural network that is composed of multiple layers of interconnected nodes or artificial neurons. A DNN may for example include convolution neural networks (CNN) designed to work with multi-dimensional grid-like data (e.g., a spectrogram), recurrent neural networks (RNNs) or variants like Long Short-Term Memory (LSTM), which can be combined with CNNs.

DNNs generally include an Input Layer that receives the raw data or features. Each neuron in this layer corresponds to an input feature. For example, in image recognition, each neuron might represent a pixel's intensity value. DNNs further include a Weighted Sum and Activation Function in which each connection between neurons in adjacent layers has an associated weight. The input data is multiplied by these weights, and the results are summed up for each neuron in the next layer. An activation function is applied to this weighted sum to introduce non-linearity and make the network capable of learning complex relationships. Common activation functions include ReLU (Rectified Linear Unit), Sigmoid, and Tanh. Between the input and output layers there can be one or more Hidden Layers. These layers contain neurons that learn progressively more abstract and complex features from the input data. Each neuron in a hidden layer receives inputs from all neurons in the previous layer, applies the weighted sum and activation function, and passes the result to the next layer. The last layer in the DNN is the Output Layer, which produces the final result of the network's computation. The number of neurons in the output layer depends on the specific task. For instance, in binary classification, there might be one neuron for each class, whereas in multi-class classification, there may be one neuron per class.

The DNN is trained for example using supervised learning, e.g., by repeatedly presenting training data to the network, calculating the loss, and updating the weights using backpropagation and optimization algorithms. This process continues until the model converges to a satisfactory level of performance. The process may include use of a loss function that measures the difference between the predicted output and the actual target. Common loss functions include mean squared error for regression tasks and categorical cross-entropy for classification tasks. Optimization algorithms adjust the weights in the network to minimize the loss function iteratively. Gradient descent, stochastic gradient descent (SGD), and Adam, may for example be utilized.

Training for supervised learning may utilize a dataset that includes input data (features) and corresponding target outputs (labels). Once trained, the DNN can be used for inference on new, unseen data. The input data is passed through the network, and the output provides predictions or classifications based on what the network has learned during training. The DNN may be periodically evaluated on a separate validation dataset to monitor how well it generalizes to unseen data. This helps prevent overfitting, where the model becomes too specialized on the training data.

All or part of the functions can be implemented as special purpose logic circuitry, e.g., an FPGA and/or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

Elements of figures are shown and described as discrete elements in a block diagram. These may be implemented as one or more of analog circuitry or digital circuitry. Alternatively, or additionally, they may be implemented with one or more microprocessors executing software instructions. The software instructions can include digital signal processing instructions. Operations may be performed by analog circuitry or by a microprocessor executing software that performs the equivalent of the analog operation. Signal lines may be implemented as discrete analog or digital signal lines, as a discrete digital signal line with appropriate signal processing that is able to process separate signals, and/or as elements of a wireless communication system.

When processes are represented or implied in the block diagram, the steps may be performed by one element or a plurality of elements. The steps may be performed together or at different times. The elements that perform the activities may be physically the same or proximate one another, or may be physically separate. One element may perform the actions of more than one block. Audio signals may be encoded or not, and may be transmitted in either digital or analog form. Conventional audio signal processing equipment and operations are in some cases omitted from the drawings.

In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

Other embodiments not specifically described herein are also within the scope of the following claims. Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

We claim:

1. An audio processing system, comprising:
   an input adapted to receive an acoustic signal via a microphone;
   an electroacoustic transducer;
   an amplifier configured to amplify the acoustic signal and output an amplified signal via the electroacoustic transducer; and
   an artificial intelligence (AI) system having a machine learning model that processes the acoustic signal prior to amplification to produce a dynamic filter, wherein the AI system applies the dynamic filter to the acoustic signal to suppress feedback in the amplified signal,
   wherein the AI system transforms the acoustic signal with an asymmetric-windowed Fast Fourier Transform (FFT) into a sequence of spectral frames that are inputted to the machine learning model.

2. The audio processing system of claim 1, wherein the machine learning model comprises a neural network.

3. The audio processing system of claim 2, wherein the neural network includes one of a temporal convolutional network (TCN) or a convolutional long short term memory (ConvLSTM) network.

4. The audio processing system of claim 1, wherein each spectral frame includes approximately 100-300 frequency bins.

5. The audio processing system of claim 1, wherein processing of the acoustic signal includes:
   generating a spectral mask using the machine learning model for each spectral frame;
   applying each spectral mask to associated spectral frames to generate a sequence of filtered spectral frames; and
   applying an inverse asymmetric-windowed FFT to the filtered spectral frames to generate a filtered time domain acoustic signal.

6. The audio processing system of claim 1, wherein the machine learning model directly generates a sequence of filtered spectral frames.

7. The audio processing system of claim 1, wherein the machine learning model directly generates a filtered time domain acoustic signal.

8. The audio processing system of claim 1, wherein the machine learning model is trained with an input signal that includes a target audio component and a feedback component, and wherein the machine learning model is trained to filter out the feedback component.

9. The audio processing system of claim 8, wherein the target audio component comprises at least one of speech or music.

10. The audio processing system of claim 8, wherein the input signal used to train the machine learning model further includes a noise component, and wherein the machine learning model is trained to filter out the noise component.

11. The audio processing system of claim 1, wherein the AI system includes a plurality of machine learning models, wherein each machine learning model is trained to pass a predefined audio component and filter unwanted audio components, wherein each of the plurality of the machine learning models is selectable via a control input.

12. The audio processing system of claim 1, wherein a latency between a received acoustic signal and an amplified output is less than 10 milliseconds.

13. A public address (PA) system comprising the audio processing system of claim 1.

14. A hearing assist device comprising the audio processing system of claim 1.

15. A method comprising:
receiving an acoustic signal via a microphone input;
generating a dynamic filter from the acoustic signal using a machine learning model, wherein the machine learning model comprises a neural network and the dynamic filter comprises a spectral mask;
applying the dynamic filter to the acoustic signal to suppress feedback in the acoustic signal, wherein the acoustic signal is transformed into a sequence of spectral frames using an asymmetric-windowed Fast Fourier Transform (FFT);
amplifying the dynamically filtered acoustic signal to generate an amplified signal; and
outputting the amplified signal to an electroacoustic transducer.

16. The method of claim 15, further comprising training the machine learning model with an input signal that includes a target audio component and a feedback component, and wherein the machine learning model is trained to filter out the feedback component.

17. An audio processing system, comprising:
an input adapted to receive an acoustic signal via a microphone;
an electroacoustic transducer;
an amplifier configured to amplify the acoustic signal and output an amplified signal via the electroacoustic transducer; and
an artificial intelligence (AI) system having a plurality of machine learning models, each model trained to pass a predefined audio component or filter unwanted audio components, wherein at least one of the machine learning models is configured to process the acoustic signal prior to amplification to produce a dynamic filter, and wherein the AI system applies the dynamic filter to the acoustic signal to suppress feedback in the amplified signal.

18. The audio processing system of claim 17, wherein each of the plurality of the machine learning models is selectable via a control input.

19. An audio processing system, comprising:
an input adapted to receive an acoustic signal via a microphone;
an electroacoustic transducer;
an amplifier configured to amplify the acoustic signal and output an amplified signal via the electroacoustic transducer; and
an artificial intelligence (AI) system having a machine learning model that processes the acoustic signal prior to amplification to produce a dynamic filter, wherein the AI system applies the dynamic filter to the acoustic signal to suppress feedback in the amplified signal,
wherein a latency between a received acoustic signal and an amplified output is less than approximately 10 milliseconds.

20. A public address (PA) system comprising the audio processing system of claim 19.

* * * * *